United States Patent
Witt et al.

(10) Patent No.: US 11,865,990 B2
(45) Date of Patent: Jan. 9, 2024

(54) RAMP BRACKET FOR A CURTAIN AIRBAG

(71) Applicant: Autoliv ASP, Inc., Ogden, UT (US)

(72) Inventors: John Witt, Auburn Hills, MI (US);
Jason Ibarra, Auburn Hills, MI (US);
Matthew Reschke, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/824,445

(22) Filed: May 25, 2022

(65) Prior Publication Data
US 2023/0382342 A1 Nov. 30, 2023

(51) Int. Cl.
*B60R 21/213* (2011.01)
*B60R 21/232* (2011.01)
*B60R 21/215* (2011.01)
*B60R 21/16* (2006.01)

(52) U.S. Cl.
CPC .......... *B60R 21/213* (2013.01); *B60R 21/215* (2013.01); *B60R 21/232* (2013.01); *B60R 2021/161* (2013.01)

(58) Field of Classification Search
CPC ................ B60R 21/213; B60R 21/232; B60R 2021/161; B60R 21/217; B60R 21/2171; B60R 2021/2173; B60R 21/215
See application file for complete search history.

(56) References Cited

U.S. PATENT DOCUMENTS

| | | | | |
|---|---|---|---|---|
| 5,536,041 A | * | 7/1996 | Acker | B60R 21/23138 280/740 |
| 6,217,061 B1 | * | 4/2001 | Harland | B60R 21/04 280/751 |
| 6,439,598 B1 | * | 8/2002 | Braun | B60R 21/213 280/730.2 |
| 7,097,200 B2 | * | 8/2006 | Wold | B60R 21/213 280/730.2 |
| 7,175,196 B2 | * | 2/2007 | Boxey | B60R 21/232 280/730.2 |
| 7,213,836 B2 | * | 5/2007 | Coon | B60R 21/232 280/730.2 |
| 7,273,228 B2 | * | 9/2007 | Noguchi | B60R 21/213 280/730.2 |
| 7,401,805 B2 | * | 7/2008 | Coon | B60R 21/213 280/730.2 |

(Continued)

FOREIGN PATENT DOCUMENTS

JP 2002067860 A 3/2002

OTHER PUBLICATIONS

International Search Report and Written Opinion of the ISA issued in PCT/US2023/021814, dated Sep. 8, 2023; ISA/US.

*Primary Examiner* — Laura Freedman
(74) *Attorney, Agent, or Firm* — Harness, Dickey & Pierce, P.L.C.; Stephen T. Olson (57) ABSTRACT

A ramp bracket for a curtain airbag of a vehicle includes a back wall, at least a first trim pushing portion, and a ramp portion. The back wall extends along a length of the ramp bracket and attaches to the vehicle. The first trim pushing portion longitudinally extends along a first length portion of the length of the ramp bracket, depends from the back wall and has a downwardly or side opening shape. The ramp portion extends along a second length portion of the length of the ramp bracket, also depends from the back wall, and has an upwardly opening shape.

20 Claims, 5 Drawing Sheets

(56) References Cited

U.S. PATENT DOCUMENTS

| | | | | |
|---|---|---|---|---|
| 7,597,345 B1* | 10/2009 | Kim | B60R 21/213 | 280/728.2 |
| 7,621,559 B2* | 11/2009 | Seong | B60R 21/213 | 280/730.2 |
| 7,654,559 B2* | 2/2010 | Hidaka | B60R 21/213 | 280/730.2 |
| 7,673,897 B2* | 3/2010 | Ochiai | B60R 21/232 | 280/730.2 |
| 7,699,343 B2* | 4/2010 | Kwak | B60R 21/213 | 280/730.2 |
| 7,731,227 B2* | 6/2010 | Hotta | B60R 21/217 | 280/730.2 |
| 7,976,055 B2* | 7/2011 | Son | B60R 21/213 | 280/730.2 |
| 8,141,897 B2* | 3/2012 | Jang | B60R 21/213 | 280/730.2 |
| 8,172,258 B2 | 5/2012 | Kim et al. | | |
| 8,220,826 B2* | 7/2012 | Park | B60R 21/213 | 280/730.2 |
| 8,286,991 B2* | 10/2012 | Shimazaki | B60R 21/213 | 280/730.2 |
| 8,590,922 B2* | 11/2013 | Kim | B60R 21/213 | 280/730.2 |
| 8,596,672 B2* | 12/2013 | Sugiyama | B60R 21/213 | 280/730.2 |
| 8,833,797 B2* | 9/2014 | Suga | B60R 21/213 | 280/730.2 |
| 8,960,715 B2* | 2/2015 | Uchida | B60R 13/0212 | 280/730.2 |
| 9,889,812 B1 | 2/2018 | Bauer et al. | | |
| 11,220,232 B2* | 1/2022 | Kim | B60R 21/217 | |
| 11,235,730 B2* | 2/2022 | Schoonover | B60R 13/0212 | |
| 2008/0122203 A1* | 5/2008 | Steinbach | B60N 3/026 | 280/728.2 |
| 2008/0252047 A1 | 10/2008 | Fink | | |
| 2022/0258690 A1* | 8/2022 | Mar | B60R 13/025 | |

* cited by examiner

RAMP BRACKET FOR A CURTAIN AIRBAG

FIELD

The present disclosure generally relates to inflatable occupant restraints for vehicles. More particularly, the present disclosure relates to a ramp bracket for a curtain airbag of a vehicle.

BACKGROUND

This section provides background information related to the present disclosure which is not necessarily prior art.

Inflatable occupant restraints or airbags are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are commonly used for occupant protection from side impacts. For example, side curtain airbags are typically mounted along the roof rail of a vehicle and for deployment in a downward direction to provide an energy absorbing structure between the head and upper torso of an occupant and the vehicle interior components.

In the event of an accident or impending accident, a sensor within the vehicle measures abnormal deceleration, for example, and the airbag is triggered to inflate within a few milliseconds with gas produced by a device commonly referred to as an "inflator". The inflated airbag cushions the vehicle occupant from impact forces. It is important that vehicle airbags, including side curtain airbags, deploy quickly and reliably.

While known occupant restraint systems may have generally proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide a ramp bracket for a curtain airbag that ensures quick and reliable deployment of the curtain airbag.

In accordance with one particular aspect, the present teachings provide a ramp bracket for a curtain airbag of a vehicle. The ramp bracket includes a back wall, at least a first trim pushing portion, and a ramp portion. The back wall extends along a length of the ramp bracket and attaches to the vehicle. The first trim pushing portion longitudinally extends along a first length portion of the length of the ramp bracket, depends from the back wall and has a downwardly opening shape. The ramp portion extends along a second length portion of the length of the ramp bracket, also depends from the back wall, and has an upwardly opening shape.

In accordance with another particular aspect, the present teachings provide a ramp bracket for a curtain airbag of a vehicle including a first longitudinally extending portion and a second longitudinally extending portion. The first longitudinally extending portion partially defines a first channel portion of a channel for receiving the curtain airbag. The first longitudinally extending portion is open in a downward direction. The second longitudinally extending portion partially defines a second channel portion of the channel for receiving the curtain airbag and opens in an upward direction. The first longitudinally extending portion includes a first leg at a front side of the ramp bracket that is movable in a first direction from a first position to a second position in response to initial inflation of the curtain airbag. The second longitudinally extending portion includes a second leg at the front side of the ramp bracket that is movable in a second direction from a first position to a second in response to initial inflation of the curtain airbag. The second direction is opposite to the first direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, not all possible implementations, and are not intended to limit the scope of the present disclosure.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. "Exemplary" as used herein means serving as a typical or representative example or instance and does not necessarily mean special or preferred.

Figure 1:
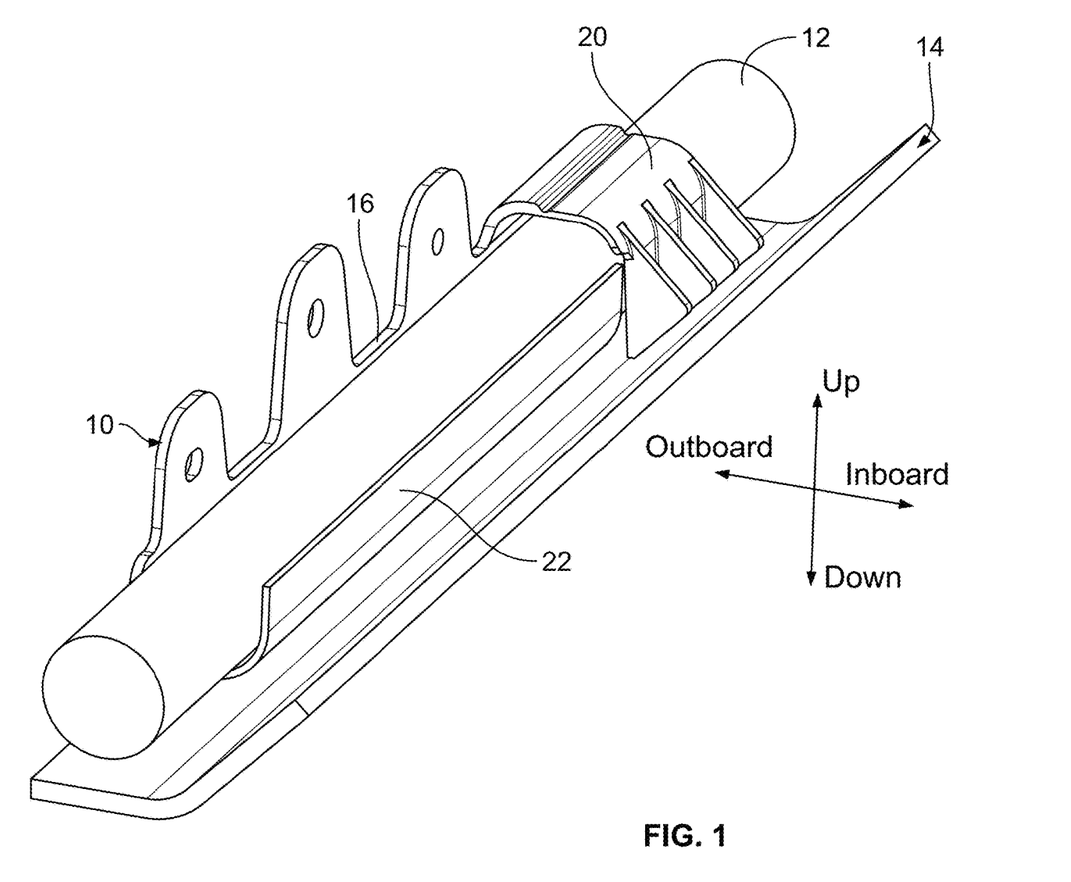
FIG. 1 is a perspective view of a ramp bracket for a curtain airbag of a vehicle in accordance with the present teachings, the ramp bracket shown operatively associated with the curtain airbag and a headliner of the vehicle, the ramp bracket and curtain airbag shown prior to deployment of the curtain airbag.
Figure 2:
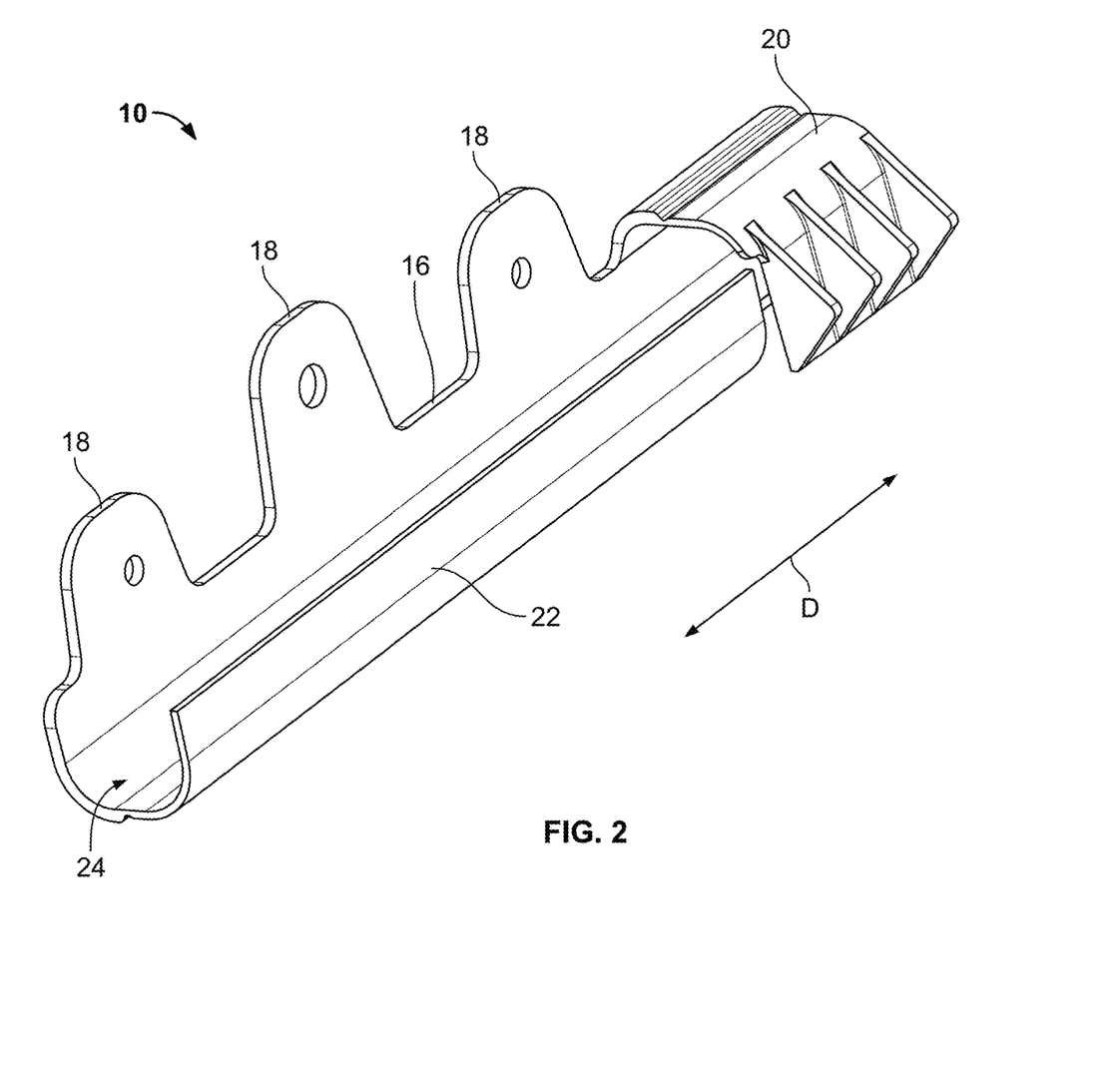
FIG. 2 is another perspective view of the ramp bracket of the present teachings, the curtain airbag removed from the ramp bracket for purposes of illustration.
Figure 3:
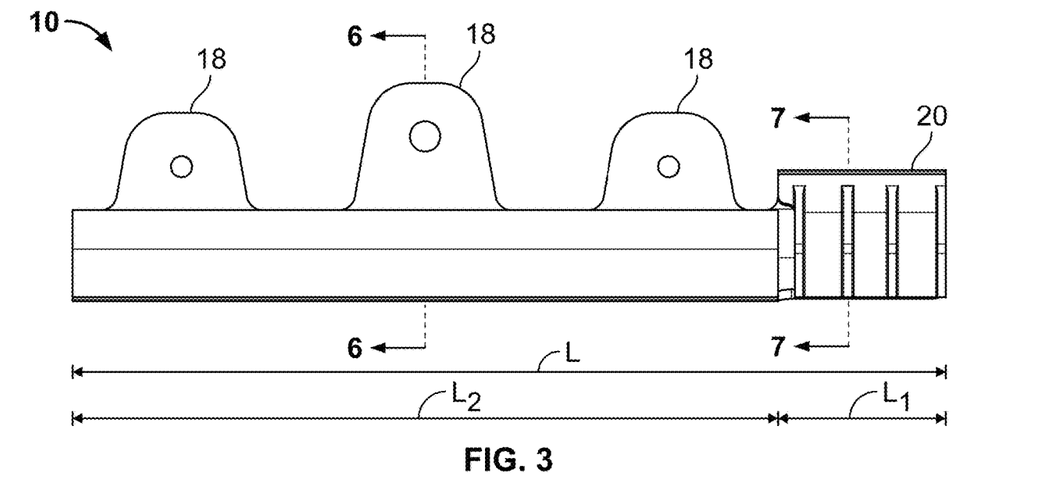
FIG. 3 is a front view of the ramp bracket of the present teachings.
Figure 4:
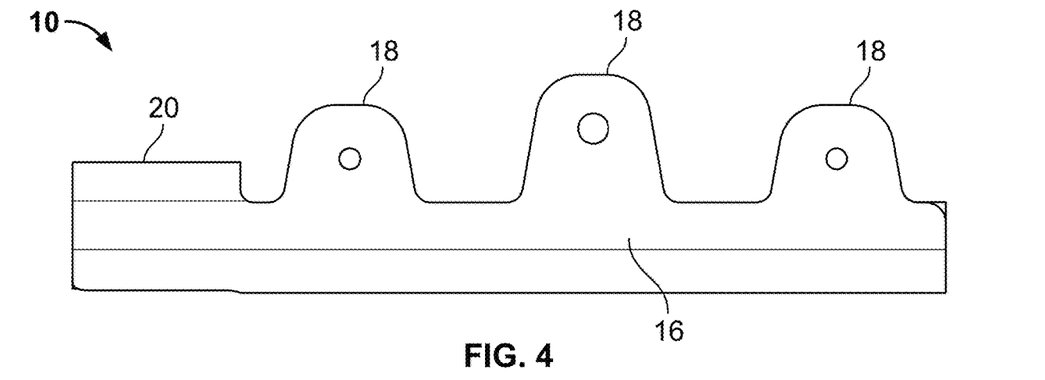
FIG. 4 is a rear view of the ramp bracket of the present teachings.
Figure 5:
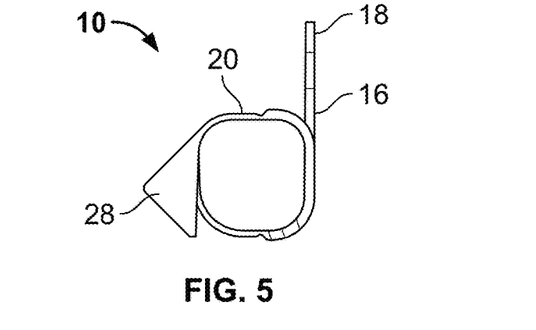
FIG. 5 is an end view of the ramp bracket of the present teachings.

With general reference to the drawings, a ramp bracket for an airbag of a vehicle in accordance with the present teachings is illustrated and generally identified at reference character 10. The ramp bracket 10 is shown in FIG. 1 operatively associated with an airbag 12 (shown in simplified form) and a headliner 14 of the vehicle. While the ramp bracket 10 is particular adapted for use with a side curtain airbag or curtain airbag 12, various aspects of the present teachings may be readily adapted for use with other vehicle airbags. As will become more apparent below, the ramp bracket 10 functions to push the headliner 14 out of a deployment path of the curtain airbag 12 to ensure quick and reliable deployment of the curtain airbag 12 along an intended trajectory.

The ramp bracket 10 is shown to generally include a back wall 16 for attachment to a frame of the vehicle. The back wall 16 may include a plurality of mounting tabs 18 for conventional attachment to the vehicle. In this regard, the back wall 16 may be directly attached to the frame of the vehicle with fasteners or may be indirectly attached to the vehicle with an attachment bracket (not shown). The back wall 16 may extend in a longitudinal direction D along a length L of the ramp bracket 10.

The ramp bracket 10 additionally generally includes a first portion or first trim pushing portion 20. The first trim pushing portion 20 longitudinally extends along a first length portion $L_1$ of the length L of the ramp bracket 10, depends from the back wall 16, and has a downwardly opening shape. As illustrated, the ramp bracket 10 may have a downwardly opening U-shape. In other applications, the ramp bracket 10 may have any other downwardly opening shape within the scope of the present teachings. The U-shape of the first trim pushing portion 20 may be cooperatively defined with the back wall 16. As used herein to describe the first trim pushing portion 20, the term "U-shape" will be understood to mean that the first trim pushing portion 20 includes a first leg 20A, a second leg 20B and a connecting portion 20C connecting the first and second legs 20A and 20B. The first and second legs 20A and 20B need not be parallel to one another and need not be straight or planar within the scope of the present teachings.

The ramp bracket 10 further generally includes a second portion or ramp portion 22. The ramp portion 22 longitudinally extends along a second length portion $L_2$ of the length L of the ramp bracket 10, depends from the back wall 16, and has an upwardly opening U-shape. Other shapes may be employed within the scope of the present teachings. The U-shape of the ramp portion 22 may be cooperatively defined with the back wall 16. The term "U-shape" as used to describe the ramp portion 22 will similarly be understood to mean that the ramp portion 22 includes a first leg 22A, a second leg 22B and a connecting portion 22C connecting the first and second legs 22A and 22B. As above, the first and second legs 22A and 22B need not be parallel to one another and need not be straight within the scope of the present teachings.

The first portion 20 defines a first longitudinally extending portion of the ramp bracket 10. This first longitudinally extending portion defines a first channel portion 24A of a channel 24 for receiving the curtain airbag 12. The first longitudinally extending portion and thereby the first channel portion 24A are open in a downward direction. The second portion 22 defines a second longitudinally extending portion of the ramp bracket 10. This second longitudinally extending portion defines a second channel portion 24B of the channel 24 for receiving the curtain airbag 12. The second longitudinally extending portion and thereby the second channel portion 24B are open in an upward direction.

Figure 7A:
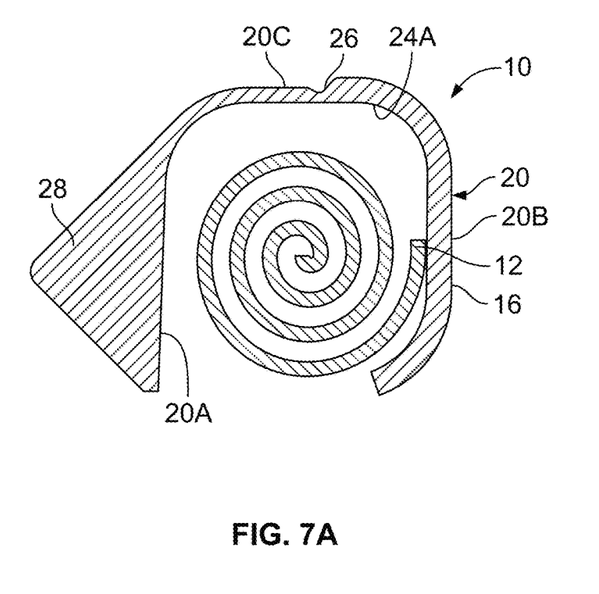
FIG. 7A is a cross-sectional view of the ramp bracket of the present teachings taken along the line 7-7 of FIG. 3 and again including a simplified view of the curtain airbag prior to deployment.
Figure 7B:
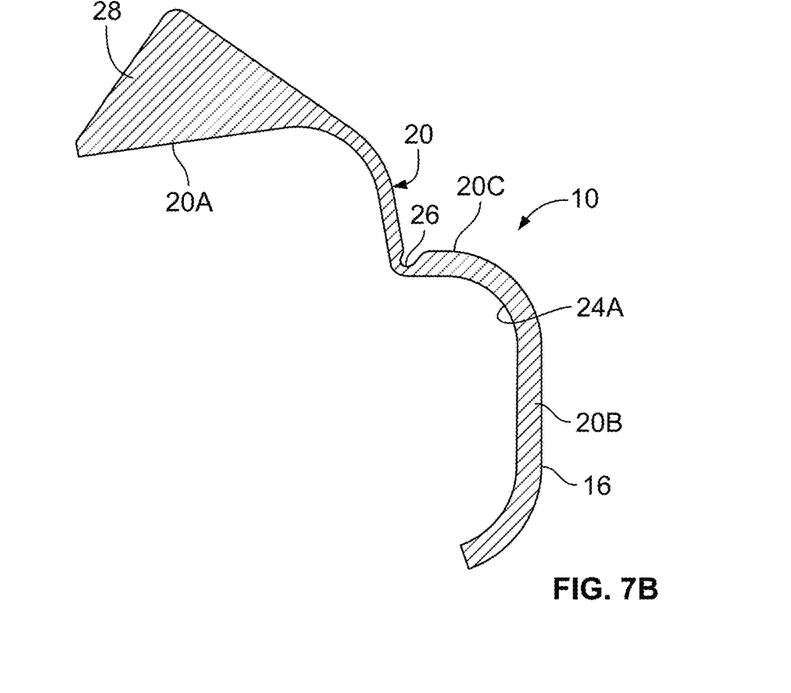
FIG. 7B is a cross-sectional view of the ramp bracket similar to FIG. 7A, but illustrating the ramp bracket after deployment of the curtain airbag.

The first leg 20A of the first portion 20 is moveable from a first leg, first position to a first leg, second position in response to initial inflation of the curtain airbag 12. The first position or initial position of the first leg 20A is shown in FIG. 7A, for example. The second position or open position of the first leg 20A is shown in FIG. 7B, for example. The first leg 20A of the first portion 20 may rotate about a longitudinally extending rotation axis in response to initial inflation of the curtain airbag. In the embodiment illustrated, the longitudinally extending rotation axis may be defined by a first relief line 26 longitudinally extending along the connecting portion 20C of the first portion 20. It will be understood that the first portion 20 may include additional relief lines for further flexibility. Furthermore, the first portion 20 may be elastically or inelastically deformable. The first leg 20A of the first portion 20 moves in a first direction from the first leg, first position to the first leg, second position. This first direction may be a circumferential direction (i.e., clockwise or counterclockwise) relative to a longitudinal axis of the channel 24. As shown in FIGS. 7A and 7B, the first direction is clockwise.

The first portion 20 may include a plurality of engagement members 28. The engagement members may be in the form of planar flanges or hollow geometric sections, for example. As shown in the drawings, the engagement members are planar flanges 28. The flanges 28 may forwardly extend from the first leg 20A. Each planar flange 28 may be oriented in a plane perpendicular to the length L of the ramp bracket 10, for example. Alternatively, the engagement members 28 may be oriented at an angle to the length of the ramp bracket 10. The flanges 28 may function to engage the headliner 14 to push the headliner 14 out of the path of the deploying airbag. In the particular embodiment illustrated, the flanges 28 many have a triangular shape. It will be understood, however, that the flanges 28 may have any shape to facilitate the opening of the headliner to release and lower the curtain airbag 12 and ramp portion 22.

Figure 6A:
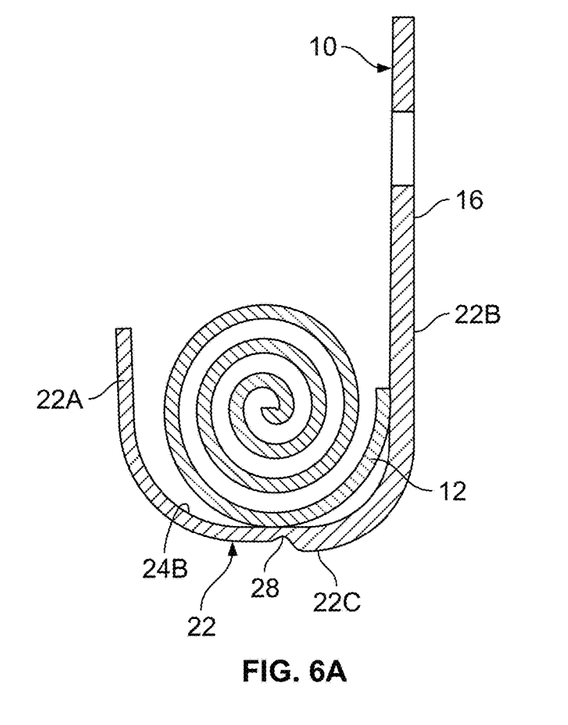
FIG. 6A is a cross-sectional view of the ramp bracket of the present teachings taken along the line 6-6 of FIG. 3 and including a simplified view of the curtain airbag prior to deployment.
Figure 6B:
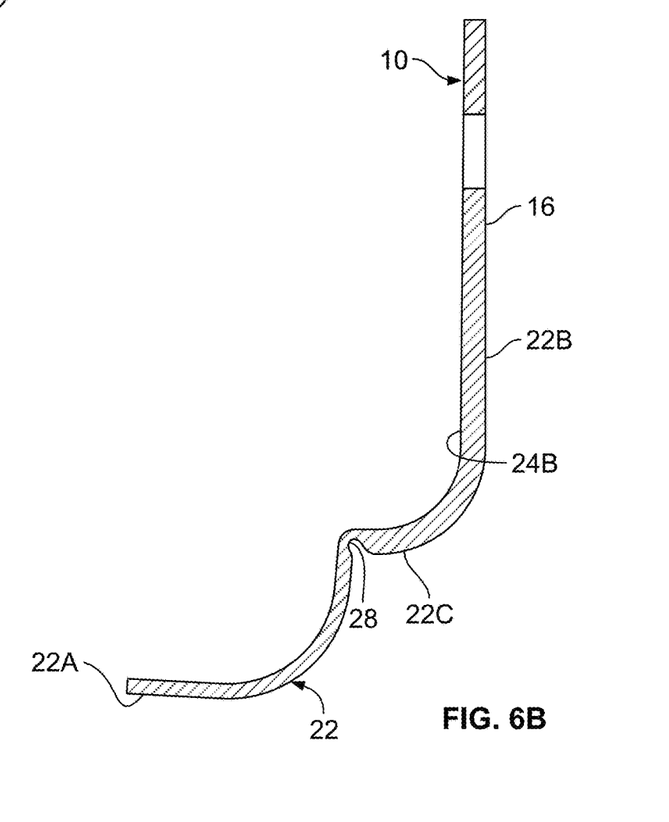
FIG. 6B is a cross-sectional view of the ramp bracket similar to FIG. 6A, but illustrating the ramp bracket after deployment of the curtain airbag.

The first leg 22A of the second portion 22 is also moveable from a first position to a second position in response to initial inflation of the curtain airbag 12. The first position or initial position of the first leg 22A is shown in FIG. 6A, for example. The second position or open position of the first leg 22A of the second portion 22 is shown in FIG. 6B, for example. The first leg 22A of the second portion 22 may rotate about a longitudinally extending rotation axis in response to initial inflation of the curtain airbag. In the embodiment illustrated, the longitudinally extending rotation axis may be defined by a second relief line 28 longitudinally extending along the connecting portion 22C of the second portion 22. It will be understood that the second portion 22 may include additional relief lines to for further flexibility. Furthermore, the second portion 22 may be elastically or inelastically deformable. The first leg 22A of the second portion 22 moves in a second direction from the first position to the second position. The second direction may be a circumferential direction opposite to the first direction. As shown in FIGS. 6A and 6B, this second circumferential direction is counterclockwise.

The ramp bracket 10 is illustrated to include at least one first portion 20. In the embodiment illustrated, the ramp bracket 10 is shown to include a single first portion 20. It will be understood, however, that the ramp bracket 10 may alternatively include two or more similarly constructed first portions 20. Further in the embodiment illustrated, the first portion 20 is provided at one end of the ramp bracket 10. It will be appreciated, however, the first portion 20 may alternatively be provided along the length L of the ramp bracket 10 or at the opposite end of the ramp bracket 10 depending on the particularly intended application for the ramp bracket 10.

The ramp bracket 10 may be unitarily constructed of plastic or other suitable material capable of the described functions. For example, the ramp bracket 10 may be a one-piece structure injection molded of plastic. In other applications, however, the ramp bracket 10 may be formed from two or more discrete parts.

A longitudinal portion of the curtain airbag 12 may be carried within the channel 24 in a stowed condition. In the stowed condition, the curtain airbag 12 may be rolled. As shown in the cross-sectional views of FIGS. 6A and 7A, the curtain airbag 12 may be packaged or stowed with an outboard roll or downward fold. In this regard, the curtain airbag 12 is rolled in a direction such that initial inflation of the curtain airbag 12 outwardly presses against the first legs 20A and 22A of the first and second portions 20 and 22. In response to this pressure from initial inflation of the curtain airbag, the first legs 20A and 22A are quickly moved from their respective first positions (as shown in FIGS. 6A and 7A) to their respective second positions (as shown in FIGS. 6B and 7B). The particular amount of movement from the respective first and second positions of the first legs 20A and 22A shown in the drawings will be understood to be exemplary. In one application, the first legs 20A and 22A both rotate through at least 45 degrees.

The flanges 28 of the first leg 20A of the first portion 20 function to push the headliner 14 out of the way and allow the second portion 22 to move down and out of the way, thereby defining a ramp surface for deployment of the curtain airbag 12. In this regard, the ramp portion 22 of the ramp bracket 10 may function to protect the cloth of the curtain airbag 12 and external tethers (not shown) associated with the curtain airbag 12 by guiding the curtain airbag 12 and associated tethers over trim components during airbag deployment. The trim components may otherwise catch the curtain airbag 12 or tethers and result in airbag deployment that is less than ideal. Continued inflation of the curtain airbag 12 deploys the curtain airbag 12 vertically downward between a seated passenger of the vehicle and the adjacent outboard side of the vehicle.

While one or more specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A ramp bracket for a curtain airbag of a vehicle, the ramp bracket comprising:

a back wall for attachment to the vehicle, the back wall extending along a length of the ramp bracket;

at least a first trim pushing portion longitudinally extending along a first length portion of the length of the ramp bracket, the first trim pushing portion depending from the back wall and having a downwardly opening shape; and a ramp portion extending along a second length portion of the length of the ramp bracket, the ramp portion depending from the back wall and having an upwardly opening shape, wherein the first length portion is spaced from the second length portion such that there is no overlap between the first trim pushing portion and the ramp portion in an up-down direction.

2. The ramp bracket for the curtain airbag of the vehicle of claim 1, wherein the first trim pushing portion includes a first leg at a front side of the ramp bracket and a second leg at a rear side of the ramp bracket, the first leg rotatable about a first longitudinally extending rotation axis in response to inflation of the curtain airbag.

3. The ramp bracket for the curtain airbag of the vehicle of claim 2, wherein the first trim pushing portion includes a first longitudinally extending relief line defining the first longitudinally extending rotation axis.

4. The ramp bracket for the curtain airbag of the vehicle of claim 2, wherein the ramp portion includes a first leg at the front side of the ramp bracket and a second leg at the rear side of the ramp bracket, the first leg of the ramp portion rotatable about a second longitudinally extending rotation axis in response to inflation of the curtain airbag.

5. The ramp bracket for the curtain airbag of the vehicle of claim 4, wherein the first trim pushing portion includes a first longitudinally extending relief line and the first trim pushing portion includes a second longitudinally extending relief line.

6. The ramp bracket for the curtain airbag of the vehicle of claim 2, wherein first trim pushing portion includes a plurality of engagement members forwardly extending from the first leg.

7. The ramp bracket for the curtain airbag of the vehicle of claim 1 in combination with the airbag.

8. The ramp bracket for the curtain airbag of the vehicle of claim 7, wherein the first trim pushing portion and the ramp portion each partially define a channel for receiving the curtain airbag.

9. The ramp bracket for the curtain airbag of the vehicle of claim 7 in combination with the airbag, wherein the airbag is rolled or folded in a stowed condition.

10. The ramp bracket for the curtain airbag of the vehicle of claim 9, wherein the airbag is rolled in an outboard roll or downward fold in the stowed condition.

11. A ramp bracket for a curtain airbag of a vehicle, the ramp bracket comprising:

a first longitudinally extending portion defining a first channel portion of a channel for receiving the curtain airbag, the first longitudinally extending portion being open in one of a downward and an inboard direction; and a second longitudinally extending portion defining a second channel portion of the channel for receiving the curtain airbag, the second longitudinally extending portion being open in an upward direction, wherein the first longitudinally extending portion includes a first leg at a front side of the ramp bracket, the first leg movable in a first direction from a first leg first position to a first leg second position in response to initial inflation of the curtain airbag, and wherein the second longitudinally extending portion includes a second leg at the front side of the ramp bracket, the second leg movable in a second direction from a second leg first position to a second leg second position in response to initial inflation of the curtain airbag, wherein the first longitudinally extending portion is distinct from the second longitudinally extending portion such that there is no overlap between the first and second longitudinally extending portions in an up-down direction.

12. The ramp bracket for the curtain airbag of the vehicle of claim 11, wherein the first direction is a first circumferential direction relative to a longitudinal axis of the channel and the second direction is a second circumferential direction.

13. The ramp bracket for the curtain airbag of the vehicle of claim 12, wherein the ramp bracket is a one-piece structure unitarily formed to include the first longitudinally extending portion and the second longitudinally extending portion.

14. The ramp bracket for the curtain airbag of the vehicle of claim 12, wherein the first longitudinally extending portion includes a first longitudinally extending relief line defining a first longitudinally extending rotation axis about which the first leg moves from the first leg first position to the first leg second position and the second longitudinally extending portion includes a second longitudinally extending relief line defining a second longitudinally extending rotation axis about which the second leg moves from the second leg first position to the second leg second position.

15. The ramp bracket for the curtain airbag of the vehicle of claim 12, in combination with the curtain airbag, the curtain airbag disposed in the channel.

16. The ramp bracket for the curtain airbag of the vehicle of claim 11, wherein the first longitudinally extending portion includes a trim pushing portion with a generally downwardly opening U-shape, and the second longitudinally extending portion includes a ramp portion with an upwardly opening U-shape.

17. The ramp bracket for the curtain airbag of the vehicle of claim 16, wherein the trim pushing portion is moveable to displace a headliner of the vehicle from a path of the curtain airbag upon deployment.

18. The ramp bracket for the curtain airbag of the vehicle of claim 11, wherein the second longitudinally extending portion defines a ramp surface in the second position for the curtain airbag upon deployment of the curtain airbag.

19. A method of deploying the curtain airbag with the ramp bracket of claim 11, the method comprising:

moving the first leg in the first direction from the first leg first position to the first leg second position in response to initial inflation of the curtain airbag, and moving the second leg in the second direction from the second leg first position to the second leg second position in response to initial inflation of the curtain airbag.

20. The method of deploying the curtain airbag of claim 19, further comprising further inflating the curtain airbag to deploy the curtain airbag in one of an inboard, outboard, and neutral direction and in a downward direction.

* * * * *